Figure 1:
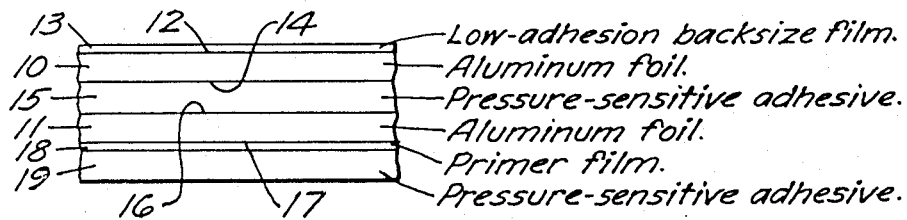

- Low-adhesion backsize film.
- Aluminum foil.
- Pressure-sensitive adhesive.
- Aluminum foil.
- Primer film.
- Pressure-sensitive adhesive.

- Low-adhesion backsize film.
- Aluminum foil.
- Primer film.
- Pressure-sensitive adhesive.

INVENTORS
ANDREW T. KNUTSON
MELVIN O. KALLEBERG.
BY
Carpenter, Abbott, Coulter & Kinney
ATTORNEYS United States Patent Office
3,092,250
Patented June 4, 1963

3,092,250
PRESSURE SENSITIVE ADHESIVE TAPE IN WHICH THE ADHESIVE IS A MIXTURE OF SYNTHETIC RUBBER AND ACRYLATE
Andrew T. Knutson, White Bear Lake, and Melvin O. Kalleberg, Minneapolis, Minn., assignors to Minnesota Mining and Manufacturing Company, St. Paul, Minn., a corporation of Delaware
Filed Aug. 1, 1960, Ser. No. 44,073
18 Claims. (Cl. 206—59)

This invention relates to normally tacky and pressure-sensitive adhesives and to adhesive tapes made therefrom.

Normally tacky and pressure-sensitive adhesive tapes are widely used for a variety of sealing, holding, fastening, mending and masking purposes. Typical pressure-sensitive adhesive formulas as applied to such tapes contain natural or synthetic rubber and normally require a tackifier resin such as a modified resin or one of various hydrocarbon resins to provide a suitable balance of adhesion, cohesion, stretchiness and elasticity. This same balance of properties as required of pressure-sensitive adhesives is obtained with certain other rubbery materials in the absence of tackifier resins or other modifying agents. For example, it is known that certain polymers of vinyl alkyl ethers and polymers or copolymers of acrylate ester monomers are inherently tacky in their normal dry state and adhere to most surfaces on mere contact therewith.

Among the many uses which have been suggested for pressure-sensitive adhesive tapes is sound insulation, particularly in aircraft where a high premium is placed on space and weight, and heavy, bulky sound barriers cannot be tolerated. In such use, the tape is normally firmly adhered to the inner wall of the skin of the fuselage and serves to reduce transmitted sound and to damp mechanical vibration in the skin. Although closely related to sound damping, good vibration damping properties are not necessarily found in sound damping tape, and the combination of superiority in both respects is of considerable importance in many applications, FIG. 1 and FIG. 2.

Since aircraft are exposed to wide ranges in temperature, being heated to as much as 225° F. in nonventilated areas upon prolonged exposure to the sun or cooled to as low as —60° F. at normal operating altitudes, the adhesive of sound damping pressure-sensitive adhesive tape must retain satisfactory adhesion and sound damping properties over a substantial temperature range. In addition, it must not exude unpleasant odors at high temperatures, must not become brittle or otherwise lose its adhesive or sound-damping properties with age, and should have rather good resistance to moisture and to fluids to which it may be accidentally exposed in the operation of the aircraft.

Interestingly, pressure-sensitive tape adhesives exhibit widely different sound damping qualities. Silicone adhesives, in spite of their excellent solvent resistance and insensitivity to temperature changes, are entirely unsuited to such use. Resin-tackified synthetic rubber adhesives provide generally good sound damping but tend to resinify on aging and thereby lose their acoustical properties. Even though they contain no resin, pressure-sensitive adhesive polymers of acrylate ester monomers experience a substantial loss in sound damping at low temperatures.

We have now discovered pressure-sensitive adhesive tape compositons which are characterized by excellent adhesion to aluminum over the range of at least —60° to 225° F., excellent resistance to moisture and aircraft fluids, resistance to aging effects throughout the normal life of an aircraft, and good sound damping properties at all operating temperatures. In addition, the novel pressure-sensitive tape adhesives exhibit unusually good vibration damping properties, and contrary to the almost uniform experience with pressure-sensitive adhesives, some of the novel adhesives actually improve in vibration damping properties with lower temperatures in the range of 0° F.

The novel pressure-sensitive adhesive compositions are obtained from two mutually incompatible materials, the incompatibility being evidenced by the turbid, glutinous mixture obtained from transparent, free-flowing solutions of the ingredients. Almost uniformly, such incompatibility signals poor adhesive qualities and efforts are made to correct the condition, but surprisingly, the pressure-sensitive tape adhesives of this invention retain the best qualities of their individual ingredients and, in at least one respect in addition to improved sound damping at low temperatures, some of the novel adhesives are found to be superior to pressure-sensitive adhesive compositions of either ingredient separately, i.e., superior resistance to stripback from stainless steel.

In brief, the novel pressure-sensitive adhesive compositions of this invention are mixtures in substantial proportions of each of synthetic rubber and pressure-sensitive polymers or copolymers of acrylate ester monomers. Among a variety of synthetic rubbers, particularly useful rubbers include polymers of monomer comprising 50–100% butadiene and up to 50% and preferably about 10–30% styrene or 18–45% acrylonitrile or up to about 10% acrylic acid. Also useful are polychloroprene, chlorosulfonated polyethylene, polyisoprene, copolymers of isobutylene and small amounts of isoprene or butadiene. The second order transition temperature is below —20° C., and preferably below —40° C., to provide good sound damping at cold temperatures. In any event, the rubber should be soft and easy processing, i.e., have a Mooney viscosity of not more than 100. Such rubbers are readily bandable on a rubber mill, forming a banded sheet free from gel centers within 10–20 minutes. In a preferred case, the rubber is of such softness as to have a Mooney viscosity of less than 30, the bottom of the Mooney scale, but should still be solid or semi-solid, as opposed to pourable liquid.

Admixed with the synthetic rubber in the novel pressure-sensitive adhesive tape composition is a per se pressure-sensitive adhesive polymer of monomeric material, 88–100% of which is a polymer of acrylic acid ester of nontertiary alkyl alcohol, the molecules of which alkyl alcohol have 1–14 carbon atoms, the average being 5–12 carbon atoms, at least a major proportion of said molecules having a straight carbon-to-carbon chain of at least four carbon atoms terminating at the hydroxy oxygen atom, said chain including at least one-half the total number of carbon atoms in the alcohol molecule. Up to 12%, and preferably at least 3%, of said monomeric material may be at least one copolymerizable monoethylenic monomer containing, bonded to an ethylenic carbon, at least one strongly polar group attached through a carbonyl radical. Such copolymerizable monomers include acrylic acid, methacrylic acid, acrylamide, methacrylamide and itaconic acid. Small amounts of other monomers, e.g., ethyl acrylate, vinyl chloride, various methacrylate esters, butadiene, isoprene, diallyl phthalate, may be included in said monomeric material without detracting from properties of the novel compositions of this invention.

A preferred pressure-sensitive adhesive composition of this invention is a mixture of a minor but substantial proportion (25–50%) of a pressure-sensitive copolymer of an acrylate ester monomer and acrylic acid with a major proportion (50–75%) of an intermediate molecular weight copolymer of butadiene and styrene.

In spite of the incompatibility of the synthetic rubber with pressure-sensitive acrylate ester polymers, coatings of the novel adhesive compositions on flexible tape backings are entirely free from perceptible defects or discontinuities and permit of unusually smooth unwinding from roll form. Tapes including the novel adhesive compositions retain their excellent qualities over a wide range of temperatures and like unmodified polyacrylate adhesives are considered to be substantially permanent, even when exposed to direct sunlight for extended periods of time.

*Example 1*

A particular example of a pressure-sensitive acrylate ester polymer is obtained by copolymerizing isooctyl acrylate with acrylic acid, as by the following typical procedure. A mixture of 104 parts by weight of distilled water, 8 parts of a 28 percent solution of alkylated aryl polyether sodium sulfonate ("Triton X–200"), 95.5 parts of isooctyl acrylate, 4.5 parts of acrylic acid, and 0.08 part of tertiary dodecyl mercaptan was purged well with nitrogen and brought to 30° C. with agitation. There was then added 0.2 part of potassium persulfate and 0.067 part of sodium bisulfite. Polymerization proceeded rapidly with evolution of heat. The polymer was recovered from the emulsion, dried and dissolved in toluene to a coatable viscosity.

A particular example of a synthetic rubber is the copolymer of 75 parts butadiene with 25 parts styrene having an inherent viscosity of about 1.0, a latex of which was coagulated, dried and then dispersed with heptane in a power-driven mixer adapted to provide high shearing action. The coagulated latex is a soft solid, the viscosity of which is below the Mooney scale, but is readily bandable on a rubber mill. The second order transition temperature of this copolymer is about −60° C.

It should be noted that pressure-sensitive adhesive compositions of the present invention have also been prepared with a butadiene-styrene copolymer of such softness that it was almost pourable. Properties of such compositions were fair, but not of the quality of preferred compositions obtained from mixtures of the above-described synthetic rubber and acrylic ester polymer. Also, a pressure-sensitive adhesive composition offering some improvement over the prior art for sound damping purposes was prepared using butadiene-styrene copolymer having a Mooney viscosity of about 50 in admixture with crude rubber and the above-described acrylate polymer, together with resinous tackifier and other ingredients commonly employed in rubber-resin pressure-sensitive tape adhesives.

Illustrative products embodying the invention will be described in connection with the accompanying drawing, the products being shown in diagrammatic edge views.

FIGURE 1 shows a magnified edge view of an illustrative sound damping tape having two layers of thin aluminum foil 10 and 11, specifically 3-mil thick annealed aluminum foil presently marketed by the Aluminum Company of America as BE 1SO. The bright side 12 of aluminum foil 10 is provided with a thin low-adhesion backsize coating 13 formed of the copolymer of octadecyl acrylate and acrylic acid, having an ester:acid ratio of about 3:2 by weight. Adhered to the dull side 14 of aluminum foil 10 is a pressure-sensitive adhesive mixture of 62.5 percent by weight of the butadiene-styrene copolymer and 37.5 percent of the isooctyl acrylate-acrylic acid copolymer described above. By a specific exemplary procedure, the ingredients of the adhesive composition were coated on the dull surface 14 of aluminum foil 10, and the coating was dried at successive temperatures of 130°, 160° and 180° F. with five to ten minutes at each temperature to provide an adhesive layer 15 having a weight of approximately 19.5 grains per 24 square inches. Adhered in turn to adhesive layer 15 is the bright surface 16 of aluminum foil 11. The dull side 17 of aluminum foil 11 is provided with a primer layer 18 consisting essentially of an adhesion-promoting material such as a rubbery diene polymer modified with a compatible plasticizing resin. Adhered to primer layer 18 is a second layer of pressure-sensitive adhesive 19 of composition and weight identical to adhesive layer 15.

Pressure-sensitive adhesive tapes of the above-described structure have been stored in roll form without a liner for substantial periods of time, after which they could be unwound easily, handled with the fingers, and stripped from smooth surfaces without leaving adhesive residue or showing any tendency to delaminate between the intermediate adhesive and foil layers, 15 and 11, respectively.

The pressure-sensitive adhesive tape of FIGURE 1 as described above has demonstrated good sound damping qualities for aircraft. To test its effectiveness, the tape was applied to the inner surface of the aluminum fuselage skin at the forward and most noisy portion of the passenger compartment of a Douglas DC–3 aircraft. Sources of sound other than those transmitted through the wall of the compartment were minimized by the installation of a temporary bulkhead behind the test area, a floating floor, and the application of glass fiber blankets and other sound deadening materials to the windows, ventilators, and bulkheads. The tape was applied in a pyramid fashion: first, a continuous layer covering each panel of the fuselage skin; second, a layer of tape covering the central two-thirds of each panel; and third, a layer covering the central one-third of each panel.

Octave band measurements of sound pressure levels were taken at 13 locations in the compartment and compared in each band to sound pressure levels present without sound damping tape. At every frequency band, a reduction in sound pressure level was noted. The average drop for all points in the compartment is recorded in the following table.

| Frequency band (cycles/sec.) | 20 75 | 75 150 | 150 300 | 300 600 | 600 1,200 | 1,200 2,400 | 2,400 4,800 | 4,800 10,000 |
|---|---|---|---|---|---|---|---|---|
| Reduction in Sound Pressure Level (decibels) | 0.8 | 1.5 | 3.0 | 4.3 | 6.1 | 6.2 | 7.4 | 5.7 |

There have been devised scales for convenient measurement of loudness level and sound level, but both suffer from the disadvantage of something giving the wrong impression, especially to people who are unaccustomed to them. For example, when it is stated that a given acoustical treatment will reduce the loudness level from 105 to 100 db, a person not acquainted with the loudness level scale will have the impression that the change is insignificant. Actually, the average observer will judge this change to be a reduction in loudness of 35 percent. Since the overall sound pressure level in the compartment was in the order of 105 db and since the speech interference level is mainly in the range of 600 to 4800 cycles, it is seen that the sound damping tape is quite effective for the purposes for which it is intended. Presumably, the sound damping effect of the tape is better than indicated in the experiment since considerable sound was transmitted into the test compartment other than through the aircraft skin, in spite of the precautions taken. The in-flight tests were conducted under the following conditions: altitude, 8000 feet; indicated air speed, 132 knots; and air temperature, −17° C. The port engine was held at 2050 r.p.m. and the starboard engine at 2150 r.p.m. in order to control resonant effects.

The effect of applying further layers of the sound damping tape is to a large extent additive, so that if the increase in weight can be tolerated, the tape is preferably utilized in multiple layers. Since the adhesive tape described above in connection with FIGURE 1 has a weight of only about 0.11 pounds per square foot, as many as 5 full layers or the equivalent in a pyramid construction are sometimes used. Preferably the tape is applied in a pyramid since the tape in such configuration has been found to be considerably more effective than an equal amount of tape in a uniform application.

Sound damping pressure-sensitive adhesive tape is also useful in automobiles, trains, household appliances and a variety of other articles. A particularly interesting application is to metal furniture, a tinny effect being construed for the most part as a lack of quality. Where the tape is not subject to solvent attack, a permeable backing such as kraft paper may be substituted for one or both of the aluminum layers. In some cases, it may be desirable to supply the tape with a single rather than the dual structure of FIGURE 1, or perhaps in a three or four-fold laminate to speed application in heavy layers. In almost every application, the sound damping tape is expected to outlast the article to which it is applied, and the permanence offered by the novel pressure-sensitive adhesive compositions is of utmost importance.

Sound damping pressure-sensitive adhesive tapes have been prepared with a variety of proportions of butadiene-styrene copolymer and pressure-sensitive copolymer of acrylic acid with acrylate ester monomer. Experiments indicate that the synthetic rubber should comprise the major proportion of the adhesive mixture to obtain increasingly good damping properties with lowered temperatures in the range of 0° F. However, where exposure to extreme cold is not expected or optimum damping is not required during such exposure, adhesive compositions containing major proportions of pressure-sensitive acrylate ester polymer are entirely satisfactory. While superior damping properties over wide temperature ranges are possessed by adhesive compositions including considerably more than 75 percent synthetic rubber, such compositions lack the balance of properties required of good pressure-sensitive adhesives and are not preferred.

The pressure-sensitive adhesive tape described above and illustrated in FIGURE 1 has been tested for resistance to sunlight and weathering by attaching it by its functional adhesive layer to an aluminum plate permanently mounted facing south at 45 degrees to the horizontal. After six months exposure, the tape was stripped away without transfer of adhesive to the plate and without ill effect to either the aluminum foil or adhesive layer. The adhesive was still aggressively tacky and the tape was subject to reapplication to the aluminum plate without loss of holding power.

Figure 2:
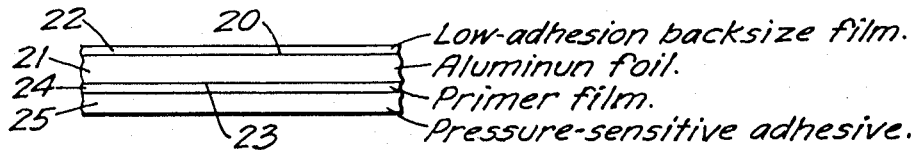

Also adhered to the aluminum plate for a period of six months was a pressure-sensitive adhesive tape having a construction as illustrated in FIGURE 2, to which reference now is made. The bright surface 20 of 3-mil annealed aluminum foil 21 is provided with an ultra-thin low-adhesion backsize coating 22. Adhered to the dull side 23 of the foil 21 is a thin primer layer 24 to which in turn is bonded a layer of pressure-sensitive adhesive 25. The adhesive tape tested for resistance to the elements was of such construction and included the same foil, primer film, and adhesive of the tape construction described above in connection with FIGURE 1 but had no backsize layer, which layer would be required for satisfactory storage in roll form. After the six-month exposure, the tape was stripped cleanly away without adhesive transfer and its adhesive layer exhibited no observable defect as a result of the exposure.

The tape of FIGURE 2 likewise can function as a sound damping tape although the tape of FIGURE 1 is preferred for its doubled strength and more convenient application. However, single-ply pressure-sensitive adhesive tape has a number of highly useful functions. The impermeability and sharp edge of the aluminum foil and good solvent-resistance and age-resistance of the adhesive make it well suited to masking uses. The tape is particularly promising where exposure to the elements is required, e.g., as a temporary covering for plastics or the like to protect them from sand or rain erosion.

The superior resistance to stripback from stainless steel of the novel pressure-sensitive tape adhesive of Example 1 has been demonstrated by comparing the tape described above in connection with FIGURE 2 to otherwise identical tapes except for the composition of the adhesive layer. One-inch wide strips of each tape were rolled into full contact with a stainless steel plate which had been polished to a mirror surface, and measurements were taken of the force required to strip each back from the plate at an angle of essentially 180 degrees and at a constant speed of 90 inches per minute. Tape having as its adhesive layer the copolymer of 94.5 parts isooctyl acrylate and 5.5 parts acrylic acid required a stripping force of 66 ounces; tape having a layer of the copolymer of 75 parts butadiene and 25 parts styrene as its adhesive required a force of 58 ounces; and the tape of this invention having as an adhesive layer a mixture of 62.5 parts of the butadiene-styrene copolymer and 37.5 parts of the acrylate ester polymer (the pressure-sensitive adhesive composition of Example 1) required a stripping force of 74 ounces. Each of the adhesive layers had a dry coating weight of about eight grains per 24 square inches.

Another series of tapes was prepared to compare the tape described above in connection with FIGURE 2 to otherwise identical tapes except for the compositions of the adhesive layers, which were as follows:

| Example # | Rubber | Acrylate ester polymer |
| --- | --- | --- |
| 2 | SBR | Fusel oil acrylate:acrylic acid copolymer (90:10). |
| 3 | SBR | Isooctyl acrylate:acrylic acid copolymer (90:10). |
| 4 | Nitrile | Isooctyl acrylate:acrylic acid copolymer (94.5:5.5). |

"SBR" is the present commercial designation for butadiene-styrene copolymers, and in this series of tapes the SBR rubber was the same as the rubber of Example 1. Nitrile rubber is butadiene-acrylonitrile copolymer, in this case at a 60:40 monomer ratio and having a Mooney viscosity of about 100 and a second order transition temperature of −35° C. ("Hycar OR–15" is a commercial equivalent). The adhesive tapes, the adhesive coating of each of which was about 12 grains per 24 square inches, were tested for resistance to stripback from stainless steel in the above-described test, with the following results:

| Adhesive composition of— | Ratio of rubber to acrylate ester polymer | Stripback from steel (ounces per inch) |
| --- | --- | --- |
| Example 1 | 50:50 | 64 |
|  | 62.5:37.5 | 64 |
|  | 75:25 | 62 |
| Example 2 | 50:50 | [1] 88 |
|  | 75:25 | 68 |
| Example 3 | 50:50 | [1] 40–80 |
|  | 75:25 | 52 |
| Example 4 | 50:50 | 52 |
|  | 75:25 | 38 |

[1] Jerky removal.

Each of the tapes of the foregoing table demonstrated good sound damping properties. The best of the 75:25 mixtures for sound damping purposes in qualitative tests carried out at room temperature and at 32° F. was the tape coated with the adhesive composition of Example 1.

When the tapes of 50:50 mixtures were compared as a group, the tape coated with the adhesive composition of Example 1 was adjudged best at 32° F., but that coated with Example 4 appeared to be superior at room temperature.

*Example 5*

A mixture was prepared of 62.5 parts of the butadiene-styrene copolymer of Example 1 and 37.5 parts of the copolymer of 96.3 parts isooctyl acrylate and 3.7 parts acrylamide. This composition also has good pressure-sensitive adhesive and sound damping properties.

*Example 6*

The homopolymer of methylisoamylacrylate mixed with the butadiene-styrene rubber of Example 1 at a ratio of 62.5 parts of rubber to 37.5 parts of acrylate ester polymer also provided a superior pressure-sensitive adhesive composition.

The following examples concern pressure-sensitive adhesive compositions based on other rubbers. In each the ratio of rubber to acrylate polymer was 62.5 to 37.5.

| Example # | Rubber | Acrylate ester polymer |
|---|---|---|
| 7 | Butyl | Isooctylacrylate homopolymer. |
| 8 | ----do---- | Isooctylacrylate:acrylic acid copolymer (94.5:5.5). |
| 9 | Polychloroprene | Isooctylacrylate homopolymer. |
| 10 | ----do---- | Isooctylacrylate:acrylic acid copolymer (94.5:5.5). |
| 11 | Chlorosulfonated polyethylene. | Isooctylacrylate homopolymer. |
| 12 | ----do---- | Isooctylacrylate:acrylic acid copolymer (94.5:5.5). |
| 13 | Nitrile | Isooctylacrylate homopolymer. |
| 14 | ----do---- | Isooctylacrylate:acrylic acid copolymer (94.5:5.5) |
| 15 | Latex crepe | Isooctylacrylate homopolymer. |
| 16 | ----do---- | Isooctylacrylate:acrylic acid copolymer (94.5:5.5). |
| 17 | SBR rubber of Example 1. | Isooctylacrylate homopolymer. |

The butyl rubber (copolymer of isobutylene with about 1–2% isoprene) had a Mooney viscosity of about 45 and a second order transition temperature of about −75° C. The polychloroprene ("Neoprene WRT") had a Mooney viscosity of about 50 and a second order transition temperature of about −60° C. The Mooney viscosity of the chlorosulfonated polyethylene ("Hypalon 20") was about 30. For the latex crepe, the Mooney viscosity was about 60–70 and the second order transition temperature was about −70° C. The nitrile rubber was that of Example 4.

Each of these elastomers, except the butyl rubber which was obtained as a 31.4% solution in heptane ("Enjay #365"), was milled long enough to remove gel centers in the banded sheet. Each sheeted elastomer was cut into pieces and dissolved in a churn in appropriate solvent. The butyl rubber and nitrile rubber made up 16% solutions in equal parts of toluene and methyl ethyl ketone. The chlorosulfonated polyethylene and the latex crepe made up 16% solutions in toluene.

The isooctyl acrylate homopolymer used in Examples 7, 9, 11, 13, 15 and 17 was in a 26% solution of 65 parts ethyl acetate and 25 parts heptane. The isooctylacrylate: acrylic acid copolymer was in a 38% solution in toluene.

Each of the compositions of Examples 7–17 was coated on primed cellophane film of 1.5 mils thickness at an orifice setting to yield a dry coating weight of 7–8 grains per 24 square inches. After drying at 150° F. for 20 minutes, the film was slit to ½-inch strips which were adhered by their adhesive to clean aluminum panels and placed in an air-circulating oven for 10 days at 200° F. The resistance of the adhesive to such accelerated aging is noted below, along with data on resistance to stripback from stainless steel in the above described test using freshly prepared strips. Results compared to an identical tape except having the adhesive composition of Example 1, were as follows:

| Adhesive Composition of— | Stripback from steel (ounces per inch) | Condition of adhesive after 10 days at 200° F. |
|---|---|---|
| Example 7 | 18 | Softened but rubbery; edge transfer on removal. |
| Example 8 | 30 | Softened but rubbery; full layer transfers on removal. |
| Example 9 | 70 | Slightly softened but still rubbery.[1] |
| Example 10 | 63 | Do. |
| Example 11 | 38 | Do. |
| Example 12 | 50 | Do. |
| Example 13 | 24 | Not noticeably changed; slight residue on removal. |
| Example 14 | 27 | Do. |
| Example 15 | 30 | Softened considerably but rubbery; edge transfer on removal. |
| Example 16 | 22 | Do. |
| Example 17 | 78 | Not noticeably changed; some splitting on removal. |
| Example 1 | 100 | Slightly firmed; very slight splitting on removal. |

[1] Cellophane became too brittle to permit the strip to be peeled from the panel.

The fact that the adhesive of each composition remained rubbery after 10 days at 200° F. is indicative of good aging properties and is of considerable commercial significance in sound damping. Accordingly, tape prepared with suitable backings can be readily removed from aircraft walls after months of use, in contrast to many prior-art pressure-sensitive adhesives which resinify under the same conditions. This ability to be removed after prolonged aging is significant in other commercial uses to which tapes of the adhesive composition of this invention are being put, e.g., for sealing joints in ducts or between prefabricated metal panels, in some cases with aluminum foil 12 mils in thickness. Even though some adhesive splitting may be encountered upon removal of the backing, the significant fact is that the backing does not need to be scraped off.

For use in evaluating the stripback values in the foregoing table, identical tapes were prepared except that the adhesive coating of each consisted of only one of the ingredients. Stripback values from stainless steel were as follows:

Adhesive composition: Stripback from steel (ounces per inch)
Butyl rubber _____ 23
Polychloroprene _____ 28
Chlorosulfonated polyethylene _____ 2
Nitrile _____ 8
Latex crepe _____ 1
SBR _____ 38
Isooctylacrylate homopolymer _____ 72
Isooctylacrylate:acrylic acid
 copolymer (94.5:5.5) _____ 67

From these values, it will be observed that resistance to stripback of tapes made with the adhesives of Examples 9, 10, 11 and 12 is greater than the average of tapes made using the separate ingredients, while the adhesion of tapes using the adhesive of Examples 1 and 17 exceeds that of tape made with either ingredient.

In many potential uses of a pressure-sensitive adhesive tape as illustrated in FIGURE 2, it may be preferable to utilize other commonly employed flexible backings in place of the aluminum foil, among which a particularly preferred backing is bi-axially oriented polyethylene terephthalate film. Also, many known adhesive priming and low-adhesion backsize coatings may be utilized as will be appreciated by those skilled in the art. Likewise, pigments and other modifiers may be added to the adhesive compositions where opacity, color, increased firmness, or other effects are desired.

This application is a continuation-in-part of our co-pending application Serial No. 590,199 filed June 8, 1956, now abandoned.

We claim:
1. A pressure-sensitive adhesive tape wound upon itself in roll form and capable of being unwound from the roll without delamination or offsetting of adhesive, said tape comprising a flexible backing member, a thin low-adhesion back-size coating firmly united to one face of the backing member, and a permanently tacky and pressure-sensitive adhesive coating firmly united to the other face of the backing member, said adhesive coating comprising a mixture of (1) 25–75 parts by weight of synthetic rubber which is bandable on a rubber mill and has a Mooney viscosity of less than 100 and a second order transition temperature below −20° C., and (2) correspondingly 75–25 parts of a polymer of (a) monomeric acrylic acid ester of nontertiary alkyl alcohol, the molecules of which alkyl alcohol have 1–14 carbon atoms, the average being 5–12 carbon atoms, at least a major proportion of said molecules having a straight carbon-to-carbon chain of at least four carbon atoms terminating at the hydroxy oxygen atom, said chain including at least one-half the total number of carbon atoms in the alcohol molecule, and (b) at least one copolymerizable monoethylenic monomer containing, bonded to an ethylenic carbon, at least one strongly polar group attached through a carbonyl radical, the total copolymerizable monomer (b comprising 3–12% of the total of said monomers (a) and (b).

2. Permanently tacky and pressure-sensitive adhesive tape as defined in claim 1 wherein the flexible backing member is a foil of annealed aluminum.

3. Permanently tacky and pressure-sensitive adhesive tape, the adhesive coating of which remains rubbery even when exposed to 200° F. for 10 days, characterized by having an adhesive coating comprising a mixture of (1) 25–75 parts by weight of synthetic rubber which is bandable on a rubber mill and has a second order transition temperature below −20° C. and a Mooney viscosity of not more than 100, and (2) correspondingly 75–25 parts of a copolymer of (a) monomeric acrylic acid ester of nontertiary alkyl alcohol, the molecules of which alkyl alcohol have 1–14 carbon atoms, the average being 5–12 carbon atoms, at least a major porportion of said molecules having a straight carbon-to-carbon chain of at least four carbon atoms terminating at the hydroxy oxygen atom, said chain including at least one-half of the total number of carbon atoms in the alcohol molecule, and (b) at least one monomer copolymerizable with said acrylic acid ester and selected from the group consisting of acrylic acid, methacrylic acid, acrylamide, methacrylamide and itaconic acid in an amount comprising 3–12% of said monomers (a) and (b).

4. Permanently tacky and pressure-sensitive adhesive tape, the adhesive coating of which remains rubbery even when exposed to 200° F. for 10 days, characterized by having an adhesive coating comprising a mixture of (1) 25–75 parts by weight of synthetic rubber copolymer of butadiene and 10–30% styrene, which rubber is bandable on a rubber mill and has a second order transition temperature below −20° C. and a Mooney viscosity of not more than 100, and (2) correspondingly 75–25 parts of a copolymer of (a) monomeric acrylic acid ester of nontertiary alkyl alcohol, the molecules of which alkyl alcohol have 1–14 carbon atoms, the average being 5–12 carbon atoms, at least a major proportion of said molecules having a straight carbon-to-carbon chain of at least four carbon atoms terminating at the hydroxy oxygen atoms, said chain including at least one-half the total number of carbon atoms in the alcohol molecule, and (b) at least one monomer copolymerizable with said acrylic acid ester and selected from the group consisting of acrylic acid, methacrylic acid, acrylamide, methacrylamide and itaconic acid in an amount comprising 3–12% of said monomers (a) and (b).

5. A pressure-sensitive adhesive tape comprising two coterminous layers of aluminum foil bonded together by a layer of pressure-sensitive adhesive, one of which aluminum foils is coated with an exterior layer of said pressure-sensitive adhesive, which adhesive layers remain rubbery even when exposed to 200° F. for 10 days, characterized by the fact that said pressure-sensitive comprises a mixture of (1) 25–75 parts by weight of synthetic rubber which is bandable on a rubber mill and has a second order transition temperature below −20° C. and a Mooney viscosity of not more than 100, and (2) correspondingly 75–25 parts of a polymer of monomeric material, at least 88% of which is acrylic acid ester of nontertiary alkyl alcohol, the molecules of which alkyl alcohol have 1–14 carbon atoms, the average being 5–12 carbon atoms, at least a major proportion of said molecules having a straight carbon-to-carbon chain of at least four carbon atoms terminating at the hydroxy oxygen atom, said chain including at least one-half the total number of carbon atoms in the alcohol molecule.

6. Permanently tacky and pressure-sensitive adhesive tape, the adhesive coating of which remains rubbery even when exposed to 200° F. for 10 days, characterized by having an adhesive coating comprising a mixture of (1) 25–75 parts by weight of synthetic rubber which is bandable on a rubber mill and has a second order transition temperature below −20° C. and a Mooney viscosity of not more than 100, and (2) correspondingly 75–25 parts of a polymer of monomer comprising acrylic acid ester of nontertiary alkyl alcohol, the molecules of which alkyl alcohol have 1–14 carbon atoms, the average being 5–12 carbon atoms, at least a major proportion of said molecules having a straight carbon-to-carbon chain of at least four carbon atoms terminating at the hydroxy oxygen atom, said chain including at least one-half the total number of carbon atoms in the alcohol molecule.

7. Permanently tacky and pressure-sensitive adhesive tape as defined in claim 6 wherein 3–12% of said monomer is at least one copolymerizable monoethylenic monomer containing, bonded to an ethylenic carbon, at least one strongly polar group attached through a carbonyl radical.

8. Permanently tacky and pressure-sensitive adhesive tape as defined in claim 6 wherein said synthetic rubber is a polymer of monomer comprising 50–100% butadiene.

9. Permanently tacky and pressure-sensitive adhesive tape as defined in claim 6 wherein 20–45% of said monomer comprises acrylonitrile.

10. Permanently tacky and pressure-sensitive adhesive tape as defined in claim 6 wherein 10–30% of said monomer comprises styrene.

11. Permanently tacky and pressure-sensitive adhesive tape as defined in claim 6 wherein said synthetic rubber is polychloroprene.

12. Permanently tacky and pressure-sensitive adhesive tape as defined in claim 6 wherein said synthetic rubber is chlorosulfonated polyethylene.

13. Permanently tacky and pressure-sensitive adhesive tape as defined in claim 6 wherein said synthetic rubber is polyisoprene.

14. Permanently tacky and pressure-sensitive adhesive tape as defined in claim 6 wherein said synthetic rubber is a copolymer of isobutylene and about one percent of isoprene.

15. Permanently tacky and pressure-sensitive adhesive tape, the adhesive coating of which remains rubbery even when exposed to 200° F. for 10 days, characterized by having an adhesive coating comprising a mixture of (1) 50–75 parts by weight of synthetic rubber copolymer of butadiene and 10–30% styrene, which rubber is bandable on a rubber mill and has a second order transition temperature below −40° C. and a Mooney viscosity of less than 30, and (2) correspondingly 75–50 parts of a polymer of monomer comprising acrylic acid ester of nontertiary alkyl alcohol, the molecules of which alkyl alcohol have 1–14 carbon atoms, the average being 5–12 carbon atoms, at least a major proportion of said molecules having a straight carbon-to-carbon chain of at least four carbon atoms terminating at the hydroxy oxygen atom, said chain including at least one-half the total number of carbon atoms in the alcohol molecule.

16. Permanently tacky and pressure-sensitive adhesive tape, the adhesive coating of which remains rubbery even when exposed to 200° F. for 10 days, characterized by having an adhesive coating comprising a mixture of (1) 25–75 parts by weight of synthetic rubber which is bandable on a rubber mill and has a second order transition temperature below −20° C. and a Mooney viscosity of not more than 100, and (2) correspondingly 75–25 parts of a homopolymer of acrylic acid ester of nontertiary alkyl alcohol, the molecules of which alkyl alcohol have 1–14 carbon atoms, the average being 5–12 carbon atoms, at least a major proportion of said molecules having a straight carbon-to-carbon chain of at least four carbon atoms terminating at the hydroxy oxygen atom, said chain including at least one-half the total number of carbon atoms in the alcohol molecule.

17. Permanently tacky and pressure-sensitive adhesive tape, the adhesive coating of which remains rubbery even when exposed to 200° F. for 10 days, characterized by having an adhesive coating comprising a mixture of (1) 50–75 parts by weight of synthetic rubber copolymer of butadiene and 10–30% styrene, which rubber is bandable on a rubber mill and has a Mooney viscosity of less than 30 and a second order transition temperature below −40° C., and (2) correspondingly 50–25 parts of a copolymer of (a) monomeric acrylc acid ester of nontertiary alkyl alcohol, the molecules of which alkyl alcohol have 1–14 carbon atoms, the average being 5–12 carbon atoms, at least a major proportion of said molecules having a straight carbon-to-carbon chain of at least four carbon atoms terminating at the hydroxy oxygen atom, said chain including at least one-half the total number of carbon atoms in the alcohol molecule, and (b) acrylic acid in an amount comprising 3–12% of said monomers (a) and (b).

18. Permanently tacky and pressure-sensitive adhesive tape, the adhesive coating of which remains rubbery even when exposed to 200° F. for 10 days, characterized by having an adhesive coating comprising a mixture of (1) 63 parts by weight of a copolymer of 75 parts butadiene and 25 parts styrene and (2) about 38 parts by weight of a pressure-sensitive adhesive copolymer of 95 parts isooctyl acrylate and about 6 parts acrylic acid.

References Cited in the file of this patent

UNITED STATES PATENTS

| | | |
|---|---|---|
| Re. 24,906 | Ulrich | Dec. 13, 1960 |
| 2,599,359 | Banks et al. | June 3, 1952 |
| 2,601,016 | Hendricks et al. | June 17, 1952 |
| 2,607,711 | Hendricks | Aug. 19, 1952 |
| 2,819,032 | Detrie et al. | Jan. 7, 1958 |
| 2,852,423 | Bassett | Sept. 16, 1958 |
| 2,882,184 | Trachet | Apr. 14, 1959 |
| 2,895,865 | Humphner | July 21, 1959 |
| 2,937,109 | Bartell et al. | May 17, 1960 |